US008612410B2

(12) United States Patent
Meredith et al.

(10) Patent No.: US 8,612,410 B2
(45) Date of Patent: Dec. 17, 2013

(54) DYNAMIC CONTENT SELECTION THROUGH TIMED FINGERPRINT LOCATION DATA

(75) Inventors: Sheldon Meredith, Marietta, GA (US); Mark Austin, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 170 days.

(21) Appl. No.: 13/174,541

(22) Filed: Jun. 30, 2011

(65) Prior Publication Data

US 2013/0007058 A1     Jan. 3, 2013

(51) Int. Cl.
*G06F 7/00*     (2006.01)
*G06F 17/00*     (2006.01)

(52) U.S. Cl.
USPC ........... 707/705; 707/758; 707/769; 707/770; 707/776; 455/456.1

(58) Field of Classification Search
USPC .............. 707/705, 758, 769, 770, 776, 999.1, 707/999.3; 455/456.1
See application file for complete search history.

(56) References Cited

U.S. PATENT DOCUMENTS

| | | | |
|---|---|---|---|
| 5,724,660 A | 3/1998 | Kauser et al. |
| 5,732,354 A | 3/1998 | MacDonald |
| 5,732,383 A | 3/1998 | Foladare et al. |
| 5,844,521 A | 12/1998 | Stephens et al. |
| 5,982,324 A | 11/1999 | Watters et al. |
| 6,018,312 A | 1/2000 | Haworth et al. |
| 6,108,532 A | 8/2000 | Matsuda et al. |
| 6,148,219 A | 11/2000 | Engelbrecht et al. |
| 6,256,577 B1 | 7/2001 | Graunke |
| 6,263,190 B1 | 7/2001 | Mamori et al. |
| 6,298,233 B1 | 10/2001 | Souissi et al. |
| 6,311,078 B1 | 10/2001 | Hardouin et al. |
| 6,317,686 B1 | 11/2001 | Ran et al. |
| 6,353,778 B1 | 3/2002 | Brown et al. |
| 6,397,074 B1 | 5/2002 | Pihl et al. |
| 6,407,703 B1 | 6/2002 | Minter et al. |

(Continued)

FOREIGN PATENT DOCUMENTS

| | | |
|---|---|---|
| EP | 0856746 A2 | 8/1998 |
| JP | 2007328050 A | 12/2007 |
| WO | 2006031035 A1 | 3/2006 |

OTHER PUBLICATIONS

Fleishman. Using the Personal Hotspot on your AT & T iPhone. Published online Mar. 15, 2011. http://www.macworld.com/article/158556/2011/03/personal_hotspot_att . . . , 4 pages.

(Continued)

*Primary Examiner* — Hares Jami
(74) *Attorney, Agent, or Firm* — Turocy & Watson, LLP

(57) ABSTRACT

The disclosed subject matter provides for employing timed fingerprint location (TFL) information in dynamically selecting a subset of content from a set of content. TFL information can provide location information for user equipment without employing conventional location techniques. As such, TLF information can provide for location-centric selection of content. Further, secondary information correlated to TFL information can be received and employed in dynamic content subset selection. In an aspect, rules can be employed to predict the future location of a user equipment such that dynamic content selection can be tailored to the predicted future position of the user equipment. Moreover, privacy components can be employed to limit the propagation of sensitive information.

20 Claims, 10 Drawing Sheets

(56) References Cited

U.S. PATENT DOCUMENTS

| | | |
|---|---|---|
| 6,429,815 B1 | 8/2002 | Soliman |
| 6,453,168 B1 | 9/2002 | McCrady et al. |
| 6,526,335 B1 | 2/2003 | Treyz et al. |
| 6,560,532 B2 | 5/2003 | Cayford |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,801,782 B2 | 10/2004 | McCrady et al. |
| 6,801,855 B1 | 10/2004 | Walters et al. |
| 6,816,782 B1 | 11/2004 | Walters et al. |
| 6,933,100 B2 | 8/2005 | Igawa et al. |
| 6,933,860 B1 | 8/2005 | Gehman et al. |
| 7,065,349 B2 | 6/2006 | Nath et al. |
| 7,098,805 B2 | 8/2006 | Meadows et al. |
| 7,149,534 B2 | 12/2006 | Bloebaum et al. |
| 7,277,049 B2 | 10/2007 | Korneluk et al. |
| 7,289,039 B2 | 10/2007 | Kato et al. |
| 7,366,492 B1 | 4/2008 | Ganesh |
| 7,375,649 B2 | 5/2008 | Gueziec |
| 7,432,829 B2 | 10/2008 | Poltorak |
| 7,508,321 B2 | 3/2009 | Gueziec |
| 7,697,917 B2 | 4/2010 | Camp et al. |
| 7,706,964 B2 | 4/2010 | Horvitz et al. |
| 7,744,740 B2 | 6/2010 | Diehl |
| 7,761,225 B2 | 7/2010 | Vaughn |
| 7,831,380 B2 | 11/2010 | Chapman et al. |
| 7,848,880 B2 | 12/2010 | Cheung |
| 7,945,271 B1 | 5/2011 | Barnes et al. |
| 7,962,162 B2 | 6/2011 | McNair |
| 7,962,280 B2 | 6/2011 | Kindo et al. |
| 7,994,981 B1 | 8/2011 | Farrokhi et al. |
| 8,036,822 B2 | 10/2011 | Ho et al. |
| 8,194,589 B2 | 6/2012 | Wynn et al. |
| 8,254,959 B2 | 8/2012 | Fix et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,355,865 B2 | 1/2013 | Wagner et al. |
| 2001/0047242 A1 | 11/2001 | Ohta |
| 2002/0059266 A1* | 5/2002 | I'anson et al. ............... 707/100 |
| 2002/0077116 A1* | 6/2002 | Havinis et al. ............... 455/456 |
| 2003/0097330 A1 | 5/2003 | Hillmer et al. |
| 2003/0115260 A1 | 6/2003 | Edge |
| 2003/0222819 A1 | 12/2003 | Karr et al. |
| 2004/0127191 A1 | 7/2004 | Matsunaga |
| 2004/0131036 A1 | 7/2004 | Walsh |
| 2004/0155814 A1 | 8/2004 | Bascobert |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0272445 A1 | 12/2005 | Zellner et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0282660 A1 | 12/2006 | Varghese et al. |
| 2007/0001873 A1 | 1/2007 | Ishikawa et al. |
| 2007/0060130 A1 | 3/2007 | Gogic et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2008/0004789 A1 | 1/2008 | Horvitz et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0133730 A1 | 6/2008 | Park et al. |
| 2008/0186234 A1 | 8/2008 | Alles et al. |
| 2008/0274750 A1 | 11/2008 | Carlson et al. |
| 2009/0024546 A1 | 1/2009 | Ficcaglia et al. |
| 2009/0052330 A1 | 2/2009 | Matsunaga et al. |
| 2009/0079622 A1 | 3/2009 | Seshadri et al. |
| 2009/0104917 A1* | 4/2009 | Ben Rached et al. ...... 455/456.1 |
| 2009/0117907 A1 | 5/2009 | Wigren et al. |
| 2009/0181695 A1 | 7/2009 | Wirola et al. |
| 2009/0280828 A1 | 11/2009 | Wang et al. |
| 2009/0287922 A1 | 11/2009 | Herwono et al. |
| 2009/0310501 A1 | 12/2009 | Catovic et al. |
| 2009/0327134 A1 | 12/2009 | Carlson et al. |
| 2010/0058442 A1 | 3/2010 | Costa et al. |
| 2010/0100732 A1* | 4/2010 | Hatakeyama et al. ........ 713/161 |
| 2010/0159951 A1 | 6/2010 | Shkedi et al. |
| 2010/0189236 A1 | 7/2010 | MacDonald et al. |
| 2010/0190509 A1 | 7/2010 | Davis et al. |
| 2010/0203903 A1 | 8/2010 | Dingler et al. |
| 2010/0207470 A1 | 8/2010 | Kim et al. |
| 2010/0250542 A1 | 9/2010 | Fujimaki |
| 2010/0299060 A1 | 11/2010 | Snavely et al. |
| 2011/0010085 A1 | 1/2011 | Tanaka et al. |
| 2011/0060808 A1* | 3/2011 | Martin et al. ................. 709/217 |
| 2011/0076975 A1 | 3/2011 | Kim et al. |
| 2011/0077032 A1 | 3/2011 | Correale et al. |
| 2011/0161261 A1 | 6/2011 | Wu et al. |
| 2011/0164596 A1 | 7/2011 | Montemurro et al. |
| 2011/0172905 A1 | 7/2011 | Schroder et al. |
| 2011/0207470 A1 | 8/2011 | Meredith et al. |
| 2011/0244879 A1 | 10/2011 | Siomina et al. |
| 2012/0028650 A1* | 2/2012 | Cooper et al. ............. 455/456.1 |
| 2012/0030083 A1 | 2/2012 | Newman et al. |
| 2012/0062415 A1 | 3/2012 | Hwang et al. |
| 2012/0139782 A1 | 6/2012 | Gutt et al. |
| 2012/0158289 A1* | 6/2012 | Bernheim Brush et al. .. 701/425 |
| 2012/0323703 A1 | 12/2012 | Hillier et al. |
| 2013/0007058 A1 | 1/2013 | Meredith et al. |
| 2013/0023237 A1 | 1/2013 | Meredith et al. |
| 2013/0023274 A1 | 1/2013 | Meredith et al. |
| 2013/0023281 A1 | 1/2013 | Meredith et al. |

OTHER PUBLICATIONS

Fleischfresser. Never Stop at a Red-Light Again. Published online Aug. 30, 2011. http://www.smartplanet.com/ blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system, 7 pages.
Koukoumidis Emmanouil, Peh Li-Shiuan, Martonosi Margaret, SignalGuru: Leveraging Mobile Phones for Collaborative Traffic Signal Schedule Advisory. 14 pages.
Bitcarrier Technology. Published online at http://www.bitcarrier.com/technology. 1 page.
Hao Peng, Ban Xuegang(Jeff). Estimating Vehicle Position in a Queue at Signalized Intersections Using Simple Travel Times from Mobile Sensors. 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
OA dated Oct. 15, 2012 for U.S. Appl. No. 13/523,778, 21 pages.
OA dated Dec. 20, 2012 for U.S. Appl. No. 12/958,146, 23 pages.
OA dated Dec. 28, 2012 for U.S. Appl. No. 13/188,295, 37 pages.
OA dated Jan. 3, 2013 for U.S. Appl. No. 13/188,300, 36 pages.
OA dated Nov. 8, 2012 for U.S. Appl. No. 13/204,535, 30 pages.
Office Action dated Dec. 15, 2011 for U.S. Appl. No. 12/712,424, 34 pages.
Office Action dated Dec. 28, 2011 for U.S. Appl. No. 12/836,471, 34 pages.
Office Action dated Feb. 23, 2012 for U.S. Appl. No. 12/967,747, 31 pages.
OA dated Oct. 2, 2012 for U.S. Appl. No. 13/554,285, 19 pages.
OA dated Aug. 30, 2012 for U.S. Appl. No. 12/958,146, 40 pages.
MobileLutions Introduces MobiLoc-A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 3 pages.
OA dated Jul. 30, 2012 for U.S. Appl. No. 12/967,747, 28 pages.
OA dated Jul. 17, 2012 for U.S. Appl. No. 13/220,083, 57 pages.
Oa dated Sep. 11, 2012 for U.S. Appl. No. 13/188,345, 44 pages.

(56) References Cited

OTHER PUBLICATIONS

International Search Report for PCT Application No. US2011/026122 dated Sep. 10, 2011, 11 pages.
International Search Report for PCT Application No. US2011/026120 dated Sep. 9, 2011 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entiy/location-labs-powers-location-based-...1&ct=clnk, Oct. 12, 2010.
"Location Based Fraud Detection", Finsphere Corporation, 2008-2010.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupal.pdf. Last accessed Dec. 24, 2010, 3 pages.
Boser, et al. A training algorithm for optimal margin classifiers. In D. Haussler, editor, 5th Annual ACM Workshop on COLT, pp. 144-152, Pittsburgh, PA, 1992. ACM Press. http://citeseemist.psu.edu/viewdoc/sumunary?doi=10.1.1.21.3818. Last accessed Dec. 24, 2010, 9 pages.
Hsu, et al. A Practical Guide to Support Vector Classification. Department of Computer Science National Taiwan University, Last updated: Apr. 15, 2010. http://www.csie.ntu.edu.tw/~cjlin/papers/guide/guide.pdf. Last accessed Dec. 24, 2010, 16 pages.
Drucker, et al. Support Vector Regression Machines. http://scholargoogle.com/scholar?q=%22Support+Vector+Regression+Machines.%22. Last accessed Dec. 24, 2010, 7 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN luh interface Node B Application Part (NBAP) signalling (Release 8)", 3GPP TS 25.469 V8.0.0 (Dec. 2008, last viewed Jul. 1, 2009, 56 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
OA dated Apr. 13, 2012 for U.S. Appl. No. 12/416,853, 36 pages.
Final Office Action dated Jan. 25, 2013, for U.S. Appl. No. 13/554,285, 20 pages.
Non-Final Office Action dated Mar. 19, 2013, for U.S. Appl. No. 13/284,497, 46 pages.
Final Office Action dated Feb. 13, 2013, for U.S. Appl. No. 13/220,083, 48 pages.
Final Office Action dated Feb. 22, 2013, for U.S. Appl. No. 13/188,345, 45 pages.
Final Office Action dated Mar. 15, 2013, for U.S. Appl. No. 13/204,535, 18 pages.
Non-Final Office Action dated Apr. 19, 2013, for U.S. Appl. No. 13/277,595, 58 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Final Office Action dated Aug. 22, 2013 for U.S. Appl. No. 13/277,595, 36 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, ©2007 Routeware and Higher Mapping Solutions, 71 pages, downloaded from http://www.routeware.dk/download/routefinder_arcgis.pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map). Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 30 pages.
Final Office Action dated Sep. 18, 2013, for U.S. Appl. No. 13/284,497, 46 pgs.
Final Office Action dated Aug. 22, 2013, for U.S. Appl. No. 13/277,595, 36 pages.
Final Office Action dated Oct. 21, 2013, for U.S. Appl. No. 13/523,770, 24 pages.

* cited by examiner

DYNAMIC CONTENT SELECTION THROUGH TIMED FINGERPRINT LOCATION DATA

CROSS-REFERENCE TO RELATED APPLICATIONS

This application is related to U.S. Ser. No. 12/712,424 filed Feb. 25, 2010, which is hereby incorporated by reference in its entirety.

TECHNICAL FIELD

The disclosed subject matter relates to dynamic content selection and, more particularly, to dynamic content selection through timed fingerprint location data related to user equipment within a carrier network.

BACKGROUND

Conventional presentation of content, such as advertising content, informational content, etc., can be statically selected. Statically selected content can include content that is of a predetermined type and can be updateable, for example, an informational sign can present information, such as traffic conditions, in a predetermined language, such as English. Thus, the exemplary traffic information can be updated to reflect current traffic conditions, however, that information would still pertain to traffic and would still be presented in English and as such would be considered static as compared to dynamically selected. Other static content can include predetermined content that is not updated, for example, a billboard that presents the same information for a designated period of time, typically days to months. Static content can also include predetermined sets of content, for example, a billboard that cycles through two or more advertisements repeatedly for a predetermined period of time.

Conventional presentation of content can also include dynamically selected content. Dynamically selected content can include content selection that is responsive to a predetermined criterion. Frequently this predetermined criterion can include a location-centric response. For example, a display in a grocery store can dynamically present information to potential customers based on the proximity of the customer to a product or the display location of the dynamically selected content. Conventional techniques for determining a location criterion can include global positioning system (GPS), enhanced GPS (eGPS), near field communications such as infrared, radio frequency identification (RFID), etc., or proximity sensors such as electronic eyes, sonar, etc. However, techniques such as GPS, eGPS, near field communications, etc. can often be associated with increased power consumption. Further, techniques employing proximity sensors can often be associated with a particular physical installation location of the sensors. As such, dynamic content selection employing these techniques, especially in a mobile user equipment (UE) environment, can be problematic, such as where a GPS in a phone used to source location information consumes additional power and decreases the battery life of the UE.

The above-described deficiencies of conventional dynamic content selection technologies are merely intended to provide an overview of some of problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments relate to dynamic content selection through timed fingerprint location data related to user equipment. In one example embodiment, a system comprises a timed fingerprint location component configured to receive timed fingerprint location information and a content selection component configured to dynamically select a subset of content from a set of content based on the timed fingerprint location information.

In another example embodiment, a method comprises receiving timed fingerprint location information associated with a user equipment in a timed fingerprint location environment and dynamically selecting a subset of content from a set of content based on the timed fingerprint location information satisfying a predetermined condition.

In another example embodiment, a computing device comprises a processor located at a wireless carrier network, the processor configured to support location services for a user equipment operating in a timed fingerprint location environment, process timed fingerprint location information to determine satisfaction of a predetermined condition, dynamically select a subset of content from a set of content based on the satisfaction of the predetermined condition and facilitate access to the subset of content by a presentation component external to the computing device.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the drawings.

DETAILED DESCRIPTION

Figure 1:
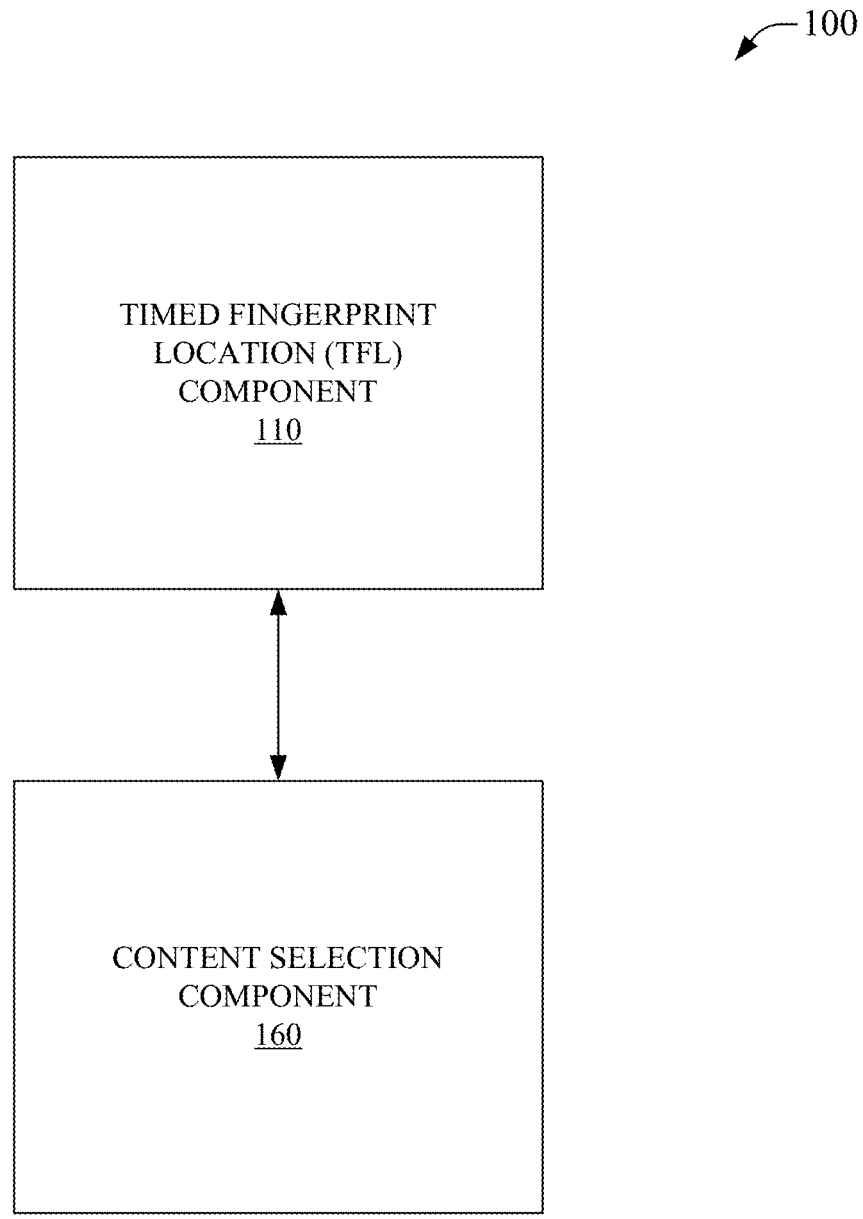
FIG. 1 is an illustration of a system that facilitates dynamic selection of content through timed fingerprint location information in accordance with aspects of the subject disclosure.

In contrast to conventional content selection techniques or systems, the presently disclosed subject matter illustrates the use of timed fingerprint location (TFL) information in dynamic content selection. TFL information can be a source of location information for UEs. Moreover, TFL information can be employed at various levels of granularity. Further, TFL information can be employed with little to no additional power consumption. TFL information can provide significant advantage over GPS type techniques, near field communication techniques, or proximity sensor techniques.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of a system 100, which facilitates dynamic selection of content through timed fingerprint location information in accordance with aspects of the subject disclosure. System 100 can include timed fingerprint location (TFL) component 110. TFL component 110 can facilitate access to TFL information. TFL information can include location or timing information as disclosed in more detail in U.S. Ser. No. 12/712,424 filed Feb. 25, 2010, which application is hereby incorporated by reference in its entirety. As such, TFL component 110 can facilitate access to location information for a UE and TFL information can be information from systems in a timed fingerprint location wireless environment, such as a TFL component of a wireless telecommunications carrier. As a non-limiting example, a mobile device, including mobile devices not equipped with a GPS-type system, can be located by looking up timing information associated with the mobile device from a TFL information reference. As such, the exemplary mobile device can be located using TFL information without employing a GPS receiver and thus without consuming power at levels typically associated with employing GPS-type techniques.

In an aspect, TFL information can include information to determine a differential value for a NodeB site pair and a bin grid frame, as disclosed in more detail in incorporated U.S. Ser. No. 12/712,424. A centroid region (possible locations between any site pair) for an observed time value associated with any NodeB site pair (NBSP) can be calculated and is related to the determined value (in units of chip) from any pair of NodeBs. When UE time data is accessed, a value look-up can be initiated (e.g., a lookup for "DV(?,X)" as disclosed in more detail in the application incorporated herein by reference). Relevant NBSPs can be prioritized as part of the lookup. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frame locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to further narrow the possible locations of the UE by providing additional intersections among relevant bin grid sets. As such, employing TFL information for location determination is demonstrably different from conventional location determination techniques or systems such as GPS, eGPS, triangulation or multilateration in wireless carrier environments, near field techniques, or proximity sensors.

System 100 can further include content selection component 160. Content selection component 160 can be communicatively coupled to TFL component 110. Moreover, content selection component 160 can facilitate dynamically selecting content based, at least in part, on TFL information. In an embodiment, location information associated with TFL information for a mobile device can be employed in dynamically selecting content by content selection component 160. As a non-limiting example, the location of a mobile device can be employed as a criterion for selecting content at content selection component 160. Content can include just about any type of information in just about any form. Content can include audible information, visual information, tactile information, olfactory information, etc. For example, content can be an audio advertisement, visual information such as an Amber alert, a sample smell, etc. Dynamic selection of a subset of content from a superset of content can be based, at least in part, on TFL information, including location information for a UE in a TFL wireless carrier environment. For example, a UE entering a designated set of bin grid frames can be a criterion for selecting a subset of content. Numerous other examples are not recited for brevity but are considered within the scope of the present disclosure.

In some embodiments, dynamic content selection can employ one or more rules in selecting content. A rule can be an algorithm or other logic employed in selection of content, such as selecting a subset of content from a set of content. As a non-limiting example, a rule can be employed to rank or order a set of content such that a subset can include a portion of the ranked or ordered content, for instance, a subset of advertising content can be selected based on the most probable future locations, ranked by probability, of a mobile device as determined from applying a predictive rule to TFL information.

In other embodiments, dynamic content selection can additionally be based on other criteria, such as profile information, in combination with TFL information. TFL information from a UE can be correlated to secondary information, such as profile information, associated with the UE. Thus, TFL information can combined with secondary information to facilitate dynamic selection of content. For example, TFL information can include location information for a UE, the TFL information can be correlated to a customer profile for the UE. The exemplary customer profile can contain user preferences, such as a customer preference for communications in Spanish. As such, the customer preference can be correlated to the location of the UE such that Spanish content can be dynamically selected. This can be useful, for example, in presenting content such as road closures, weather, traffic, Amber alerts, product advertising, etc., by way of a road-side billboard, in Spanish, when the location of the UE is appropriate to satisfy a content selection rule. As another example, in-store advertising systems, for example audio advertising over a public address system in a store, can dynamically select a Spanish advertising subset in response to the location of the exemplary UE. As such, it can be determined that the UE is in a location that is appropriate to cause dynamic selection of content, based on both TFL information and correlated secondary information.

Accessing both TFL information and secondary information can be balanced with privacy concerns by employing privacy components in certain embodiments. Numerous techniques exist for limiting the dissemination of private information and all such techniques fall within the scope of the presently disclosed subject matter. As a non-limiting example, customer specific information can be agglomerated to give a level of anonymity to customers while allowing the use of the agglomerated information in dynamic content selection. As a second non-limiting example, filtering of information can limit the dissemination of private information, such as only sharing with preapproved vendors, etc. Numerous other privacy techniques are not explicitly disclosed for brevity but are considered within the present scope. Thus, for example, TFL information or correlated secondary information can be passed through a privacy element to limit the exposure of private information in dynamic content selection, such as selecting the subset of content within the systems of a wireless carrier network and providing only indicators of selected content to third party vendors to prevent the release of information shared between a customer and the carrier network provider.

System 100 can be employed with or without secondary information for the dynamic selection of content. As a more detailed non-limiting example, a roadside billboard can be used to present dynamically selected content. TFL information associated with a UE can be accessed by TFL component 110. As such, the location of the UE can be determined. Where the UE is determined to be in a region that would allow the person possessing the UE to see the exemplary roadside billboard, based on TFL location information of the UE, content can be dynamically selected for presentation on the roadside billboard. Where the roadside billboard is an electronic display, content can be selected and sent for display. Similarly, where the roadside billboard displays two or more content selections, one of the content selections can be dynamically selected based on the location of the UE. Moreover, where the billboard is viewable only with illumination, such as at night, the location of the UE can be employed in "dynamically selecting" the content by selectively indicating when illumination should be provided to the billboard, as compared to continuously consuming energy to illuminate the billboard all night even when nobody is around to view the billboard. Furthermore, it will be appreciated that incorporation of correlated secondary information can provide other content selection criteria within system 100. It is noteworthy that a nearly limitless number of other exemplary permutations can be presented to illustrate the benefits of dynamic selection of content through TFL information, but further enumeration of examples are truncated simply for brevity and clarity, though all other permutations are to be considered within the scope of the present disclosure.

Figure 2:
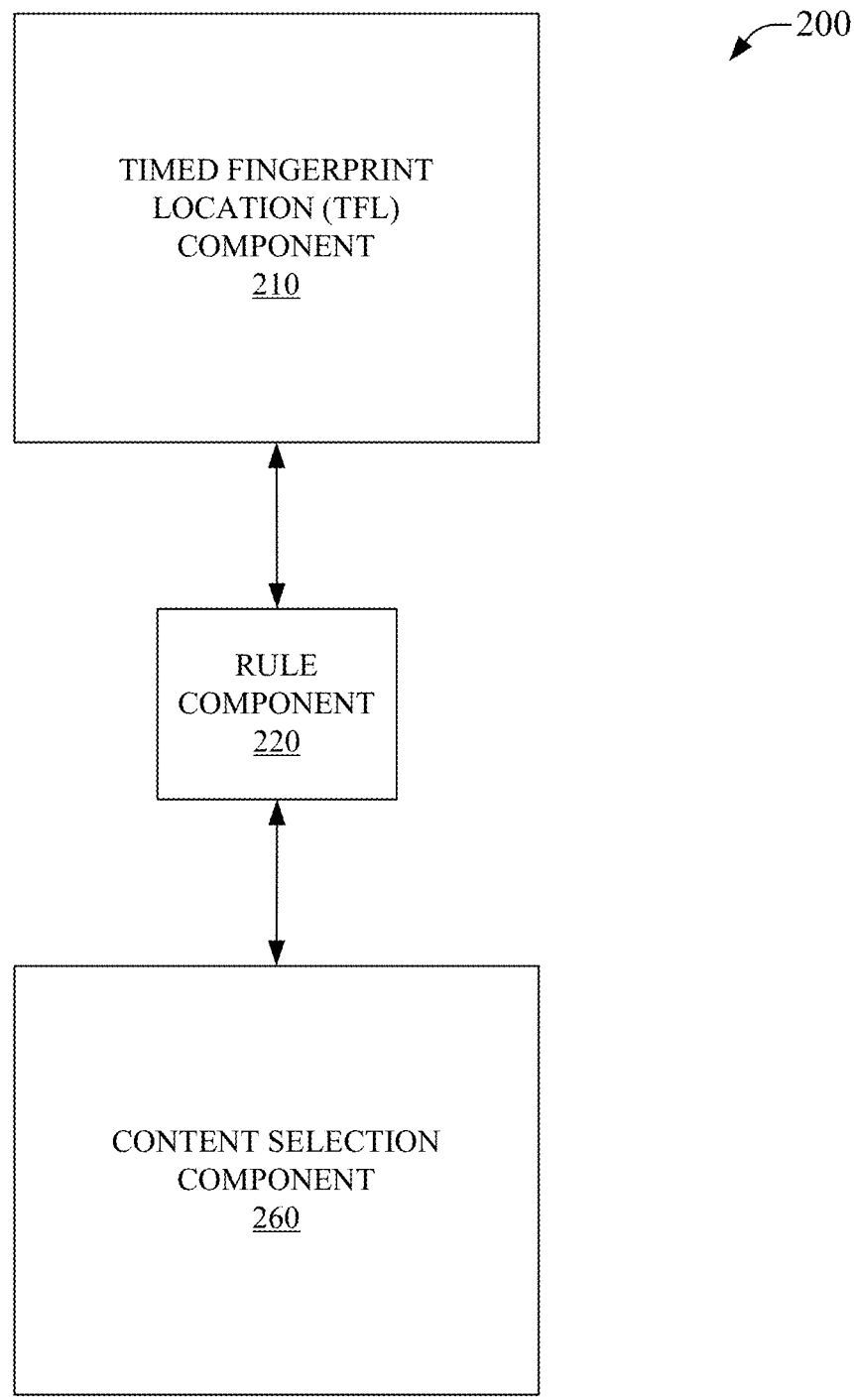
FIG. 2 is a depiction of a system that facilitates dynamic selection of content through timed fingerprint location information in accordance with aspects of the subject disclosure.

FIG. 2 is a depiction of a system 200 that can facilitate dynamic selection of content through timed fingerprint location information in accordance with aspects of the subject disclosure. System 200 can include TFL component 210. TFL component 210 can be the same as, or similar to, TFL component 110. TFL component 210 can facilitate access to TFL information. For example, TFL location information from a UE can be received at TFL component 210. TFL component 210 can be communicatively coupled to content selection component 260 by way of rule component 220. Content selection component 260 can be the same as, or similar to, content selection component 160. Content selection component 260 can facilitate dynamic selection of content based, at least in part, on TFL information.

Rule component 220 can facilitate employing one or more rules in dynamic selection of content through TFL information. In an embodiment, rule component 220 can be a rule engine that allows the application of logical determinations to be embodied in one or more algorithms related to the access or use of TFL information by way of TFL component 210. As a non-limiting example, rule component 220 can generate a rule that allows access to TFL information only when the party attempting to access the TFL information is certified to access the TFL information, such as the party is certified to employ minimum privacy standards, that the party is certified to be a current subscriber to TFL information, that the party is certified to be on a whitelist or not on a blacklist of parties accessing the TFL information, etc. In other embodiments, rule component 220 can directly apply predetermined rules to TFL information. For example, rule component 220 can apply a forecasting rule that predicts the location of a UE based on the present or historic TFL information associated with the UE. The exemplary forecasting rule can, for instance, indicate that a UE will be at a certain location at a certain time based on the current location and rate of speed of the UE based on the present location of the UE and the recent historical locations of the UE from TFL information. More specifically, in this non-limiting example, where a UE is determined to be traveling at 60 miles per hour (MPH) along a freeway and is further determined to be 5 miles from the next exit ramp along that freeway, a forecast can be determined that the UE will be at or near the next exit in four to six minutes. In contrast, where the UE is determined to be at the same location but only traveling at 10 MPH, the forecast time to the next exit ramp could be computed as between 24 and 36 minutes. Where an electronic billboard is located just before the next exit, the forecast location of the UE can be valuable in selectively determining content to be displayed on the billboard.

In other embodiments, rule component 220 can generate or apply rules for nearly conceivable dynamic selection of content through TFL information. Other non-limiting examples can include rules related to privacy, information lifetime or duration, selection of parties allowed access to TFL information, manipulation of TFL information or secondary information, etc. As a non-limiting example, an error determining rule can be employed to allow access to TFL information only when it meets a content provider's minimum error values, such as preventing advertiser access to TFL information where the TFL information indicates that the UE is in stop and go traffic and, as such, the ability to predict the future position of the UE can have too great a level of error to meet the advertiser's indicated error range. As another non-limiting example, rule component 220 can allow access to TFL information only where a user has opted into sharing that information with a party requesting the information, such as allowing access to the UE TFL information to Amber alert systems where the user has previously opted into sharing TFL information with Amber alert systems, but preventing other access to the TFL information, such as to advertisers seeking the TFL information. Further explicit examples are not provided for brevity but all such examples are to be considered within the scope of the present disclosure.

Figure 3:
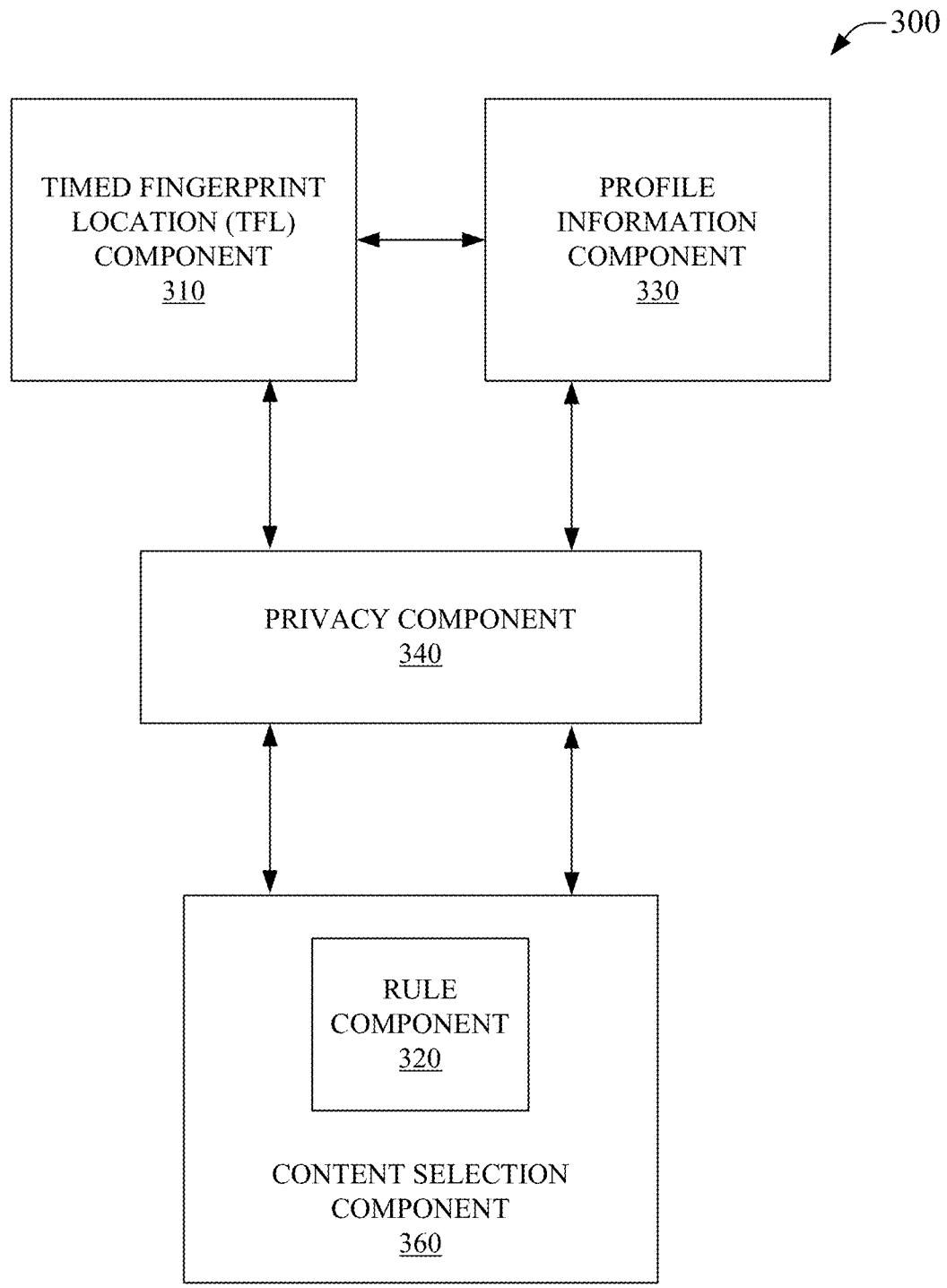
FIG. 3 illustrates a system that facilitates dynamic selection of content through timed fingerprint location information in accordance with aspects of the subject disclosure.

FIG. 3 illustrates a system 300 that facilitates dynamic selection of content through timed fingerprint location information in accordance with aspects of the subject disclosure. System 300 can include TFL component 310. TFL component 310 can be the same as, or similar to, TFL component 110 or 210. TFL component 310 can facilitate access to TFL information. Further, system 300 can include rule component 320. Rule component 320 can be the same as, or similar to, rule component 220. Rule component 320 can facilitate generation or application of one or more rules to dynamic selection of content through TFL information. Moreover, system 300 can include content selection component 360. Content selection component 360 can be the same as, or similar to, content selection component 160 and 260. Content selection component 360 can facilitate the dynamic selection of content based on TFL information. Content selection component 360 can include rule component 320.

System 300 can further include profile information component 330. Profile information component 330 can be communicatively coupled to TFL component 310. Profile information component 330 can facilitate access to secondary information correlated to TFL information. Profile information component 330, for example, can receive mobile carrier network subscriber profile information correlated to TFL information for a UE, such as by accessing a home resource locator (HLR) for an identifier associated with the UE. Moreover, in some embodiments, profile information component 330 can selectively allow access to subsets of the exemplary subscriber profile information. As such, access to none, some or all of the subscriber profile information can be selectively controlled by profile information component 330. For example, TFL information can be received by TFL component 310 for a UE and profile information for the subscriber registered to the UE can be received at profile information component 330. As such, the TFL information and correlated secondary information, e.g., the subscriber profile, can be employed in the dynamic selection of content at content selection component 360.

In some embodiments, profile information component 330 can facilitate access to one or more secondary sources of information. In an aspect, a subscriber profile can be a secondary source of information accessible by profile information component 330. Other sources of secondary information accessible by profile information component 330 can include, but are not limited to, a personal profile maintained by a user, a preference data set based on user behaviors or indicated by a user, data sets maintained by third parties such as data aggregation services or profiling services, data related to structures comprised of parties associated with other parties by one or more specific types of interdependency, such as friendship, kinship, common interest, financial exchange, dislike, sexual relationships, or relationships of beliefs, knowledge or prestige (e.g., social network information), subscriber history information, internet cookie information, internet history information, or other types of secondary information.

System 300 can further include privacy component 340. Privacy component 340 can employ privacy techniques to safeguard the dissemination of potentially sensitive information in the TFL information received at TFL component 310 or secondary information received at profile information component 330. For example, privacy component 340 can redact information, agglomerate information, restrict access to information to preapproved parties (e.g., whitelist), restrict access to information to specified parties (e.g., blacklist), threshold information, or otherwise limit, restrict, or prevent access to information deemed private. In some embodiments, such as those in which the content selection component (e.g., 360) is under the purview of the owner of a private information source, privacy component 340 can be of minimal complexity. In other embodiments, such as those where external systems are seeking access to TFL information or correlated secondary information, privacy component 340 can be of a very robust nature.

Figure 4:
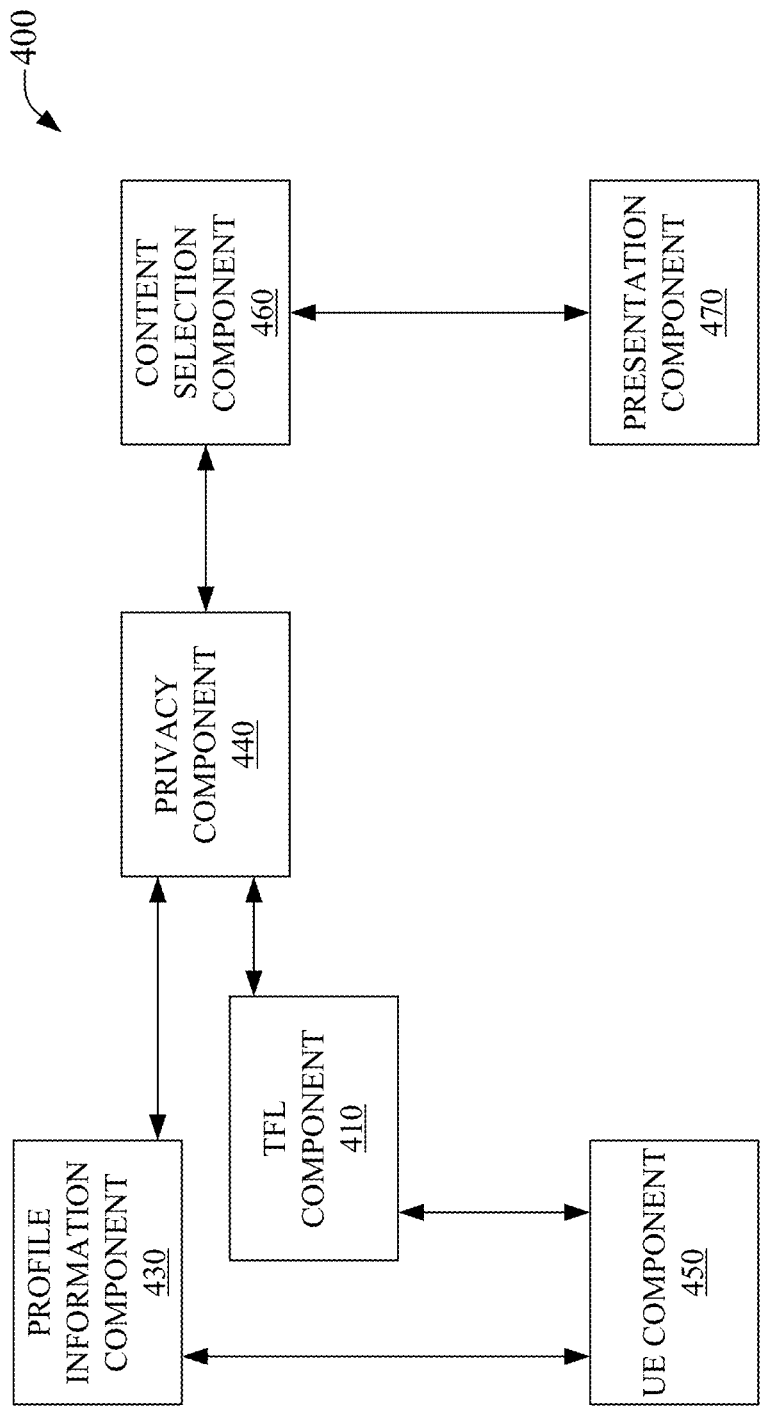
FIG. 4 is a depiction of a system that facilitates dynamic selection of content through timed fingerprint location information in accordance with aspects of the subject disclosure.

FIG. 4 is a depiction of a system 400 that facilitates dynamic selection of content through timed fingerprint location information in accordance with aspects of the subject disclosure. System 400 can include TFL component 410 that can receive TFL information. System 400 can further include, profile information component 430 that can receive secondary information correlated to TFL information. System 400 can employ privacy component 440 to selectively limit or prevent the dissemination of private information. Moreover, system 400 can include content selection component 460 that can dynamically select content based on TFL information and secondary information received by way of privacy component 440. TFL component 410, profile information component 430, privacy component 440, and content selection component 460 can be the same as, or similar to, the corresponding components as disclosed for other systems as disclosed herein.

System 400 can include UE component 450. UE component 450 can be any user equipment. As a non-limiting example, UE component 450 can be a mobile device such as a mobile phone, smartphone, tablet computer, laptop computer, automobile based computer, etc. In some embodiments, UE component 450 can include one or more of TFL component 410, profile information component 430, privacy component 440, or content selection component 460, though none of these permutations is explicitly illustrated. As such, UE component 450 can in some embodiments merely provide information to mobile carrier controlled systems to facilitate receiving TFL information or secondary information. While in other embodiments, UE component 450 can embody more components of system 400 and can provide access to information further through system 400, such as providing privacy controlled information to content selection component 460 where UE component 450 comprises TFL component 410, profile information component 430, and privacy component 440. In still other embodiments, UE 450 can provide dynamic content selection information to presentation component 470 (e.g., where UE component 450 comprises TFL component 410, profile information component 430, privacy component 440, and content selection component 460).

Dynamic content selection information can be received by presentation component 470. In some embodiments, dynamic content selection information can comprise an indication of the dynamically selected content. In other embodiments, dynamic content selection information can comprise dynamically selected content itself. For example, where a subset of content includes advertisements in Spanish, the dynamic content selection information can include the Spanish advertising content itself or can include an indicator that Spanish advertising content is acceptable for presentation. Where the actual subset of content is made accessible through content selection component 460, it is likely that more bandwidth will be consumed that where an indication of acceptable content is made available. As a non-limiting example, where an advertisement is dynamically selected, the data comprising the advertisement can be made available to presentation component 470 directly from content selection component 460, or, in contrast, an indicator of the acceptable content can be made available from content selection component 460 and presentation component 470 can access the actual advertisement content from a different source.

Figure 5:
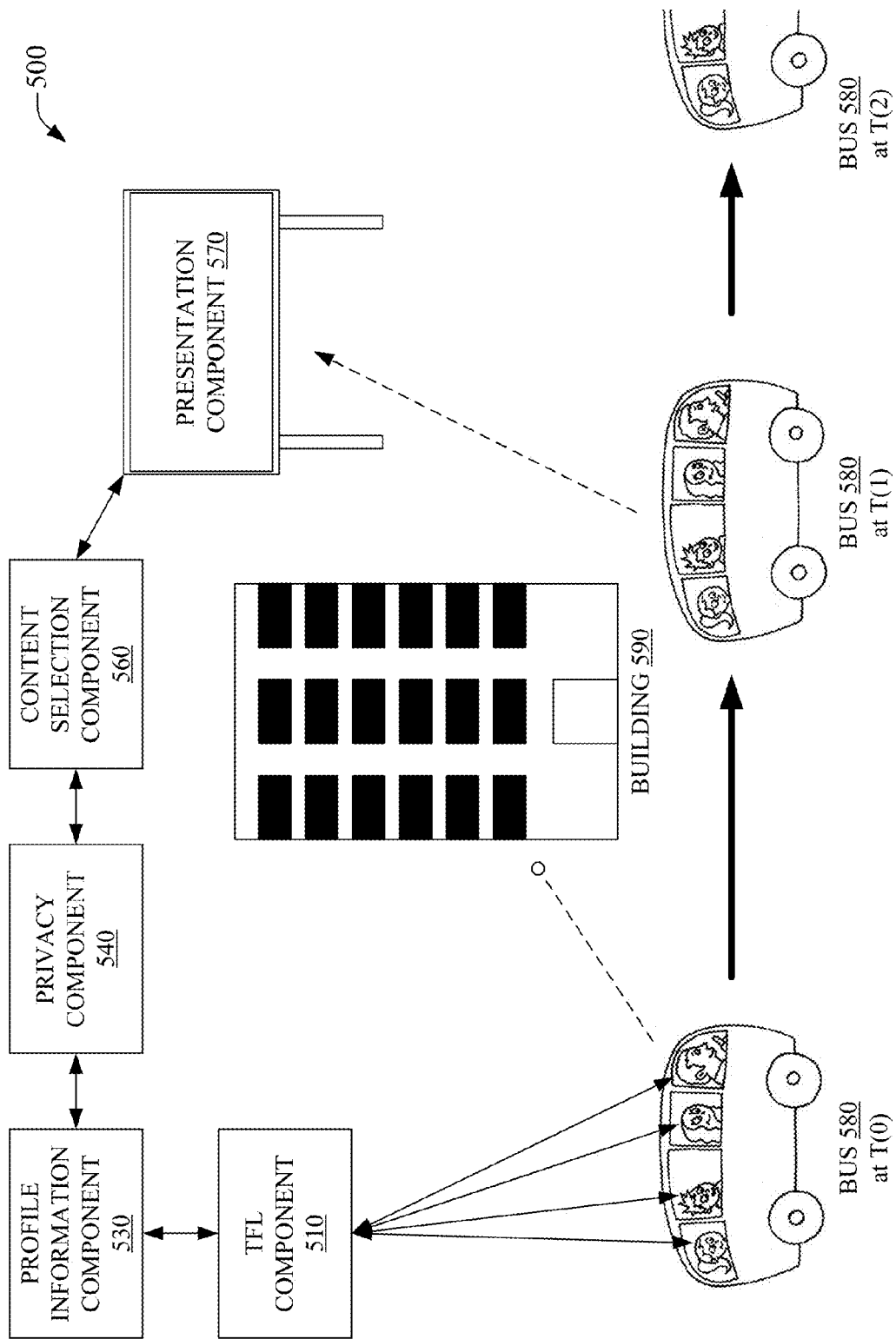
FIG. 5 illustrates a non-limiting exemplary system facilitating dynamic selection of content through timed fingerprint location information in accordance with aspects of the subject disclosure.

FIG. 5 illustrates a non-limiting exemplary system 500 facilitating dynamic selection of content through timed fingerprint location information in accordance with aspects of the subject disclosure. FIG. 5 is presented only to better illustrate some of the benefits of the presently disclosed subject matter and is explicitly not intended to limit the scope of the disclosure to the various aspects particular to the presently illustrated non-limiting example. System 500 can include TFL component 510, which can be the same as, or similar to, TFL components 110-410. Further, system 500 can include profile information component 530 that can be the same as, or similar to, profile information component 330 or 430. System 500 can also include privacy component 540, which can be the same as, or similar to, privacy component 340 or 440. Additionally, system 500 can include content selection component 560 that can be the same as, or similar to, content selection component 160-460.

System 500 can further include presentation component 570. In this particular non-liming example, presentation component 570 can be an electronic billboard. Presentation component 570 can be communicatively coupled to content selection component 560. The view of presentation component 570 is depicted as being obscured by building 590 for parties traveling along a road traversed by bus 580 between tome T(0) and time T(1) and being visible to parties traveling along a road traversed by bus 580 between tome T(1) and time T(2). It is further inherent that the various passengers on bus 580 each have a UE that can be associated with TFL information as illustrated by the several arrows between the passengers of bus 580 and TFL component 510. It is noteworthy that, while not illustrated for clarity, the communicative coupling between UEs of the passengers and TFL component 510 can exist prior to T(0) and can persist at T(1), T(2), and beyond.

As such, TFL information related to the UEs (not illustrated) of passengers on BUS 580 can be received at TFL component 510. TFL information received at TFL component 510 can include timing information allowing access to TFL location information correlating to the location of the UEs with a particular level of granularity (related to a bin grid scale as disclosed in the aforementioned related application included herein in the entirety). Furthermore, secondary information can be received at profile information component 530 correlating to the TFL information received at TFL component 510. For example, where a subscriber identity module (SIM) identifier is received by a mobile carrier at a NodeB (not illustrated for clarity) the SIM can be associated with TFL timing data allowing location lookup of the associated UE. Further, the SIM can be employed to access a subscriber profile by way of, for example, an HLR of the mobile carrier. The TFL location information and subscriber profile can be correlated for each UE on bus 580, such as at time T(0).

The TFL location information and subscriber profile information can be passed through privacy component 540. Privacy component 540 can selectively limit the dissemination of private information. In an embodiment, privacy component can agglomerate the TFL location information and subscriber profile information for all of the UEs on bus 580 and can redact primary identification information. This anonymous information can then be received at content selection component 560. Content selection component 560 can dynamically select content based on the received abstracted information passed through privacy component 540. Dynamic content selection can employ one or more rules. These rules can be content selection rules. A content selection rule can be related to forecasting the position of one or more UEs at a future time. Thus, for example, the abstracted information can include TFL location information, both present and historical, that can be passed through a forecasting rule (e.g., a forecasting algorithm) to generate a predicted time and position relationship. For example, the TFL information for the UEs on bus 580 at time T(0) can be employed to predict the location of the UEs at time T(1), T(2), etc. Furthermore, where the relative geometry between the road bus 580 is traversing, building 590, and presentation component 570 is known, the time at which presentation component 570 will likely be visible to the passengers of bus 580 can be computed (e.g., time T(1)). Thus, TFL information can be employed in dynamically selecting advertising by content selection component 560 for presentation at presentation component 570 at time T(1).

Moreover, where secondary information correlated to the UEs predicted to be in view of presentation component 570 at time T(1) is received at content selection component 560 (e.g., abstracted information content accessed by way of privacy component 540), dynamic selection of content can be based said secondary information. Thus, for example, where all of the passengers on bus 580 have indicated in their subscriber profile that they prefer to consume stock market information, this information can be employed in selecting the display of stock ticker information at T(1) alongside an advertisement on presentation component 570 to entice the passengers of bus 580 to view the advertisement while consuming the stock ticker information. It is noteworthy that between time T(0) and T(1), dynamic selection of content can prohibit the display of stock ticker information because the line of sight to presentation component 570 for passengers of bus 580 is obscured by building 590. Furthermore, stock ticker information can be dynamically removed from presentation component 570 after T(2) where it is predicted that the passengers will have passed out of view of presentation component 570.

In some embodiments, the use of GPS or other location system information can be combined with the use of TFL information without departing from the scope of the present disclosure. It is noteworthy that GPS or other location information from each UE is not required to determine TFL information as disclosed in the related application. Thus, even where legacy UEs, UEs without GPS or eGPS capabilities, are in system 500, the timing information from those legacy devices can be employed in TFL location information determinations and similarly in dynamic selection of content based on TFL information. This can be particularly useful in regions that have limited distribution of GPS enabled UEs or where GPS functions poorly due to environmental factors such as urban cores, etc.

Figure 6:
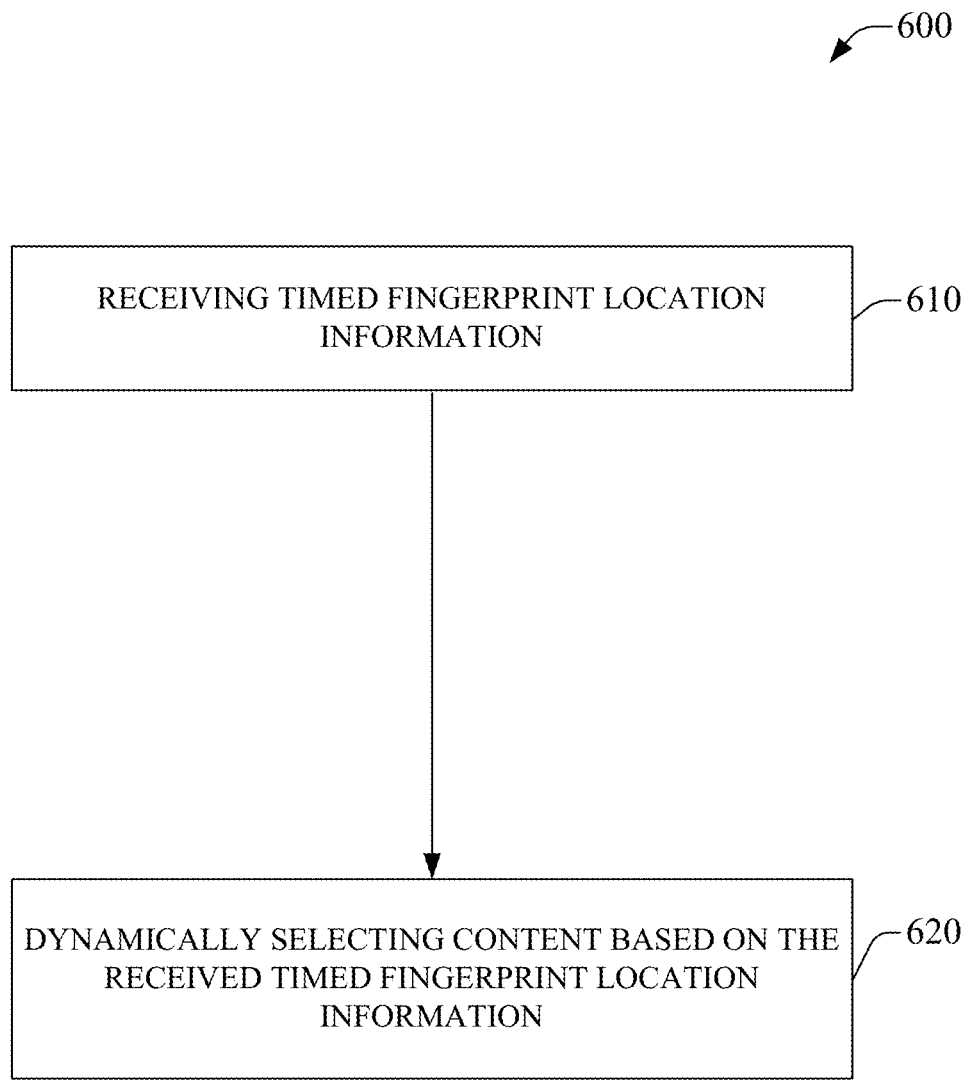
FIG. 6 illustrates a method facilitating dynamic selection of content through timed fingerprint location information in accordance with aspects of the subject disclosure.
Figure 7:
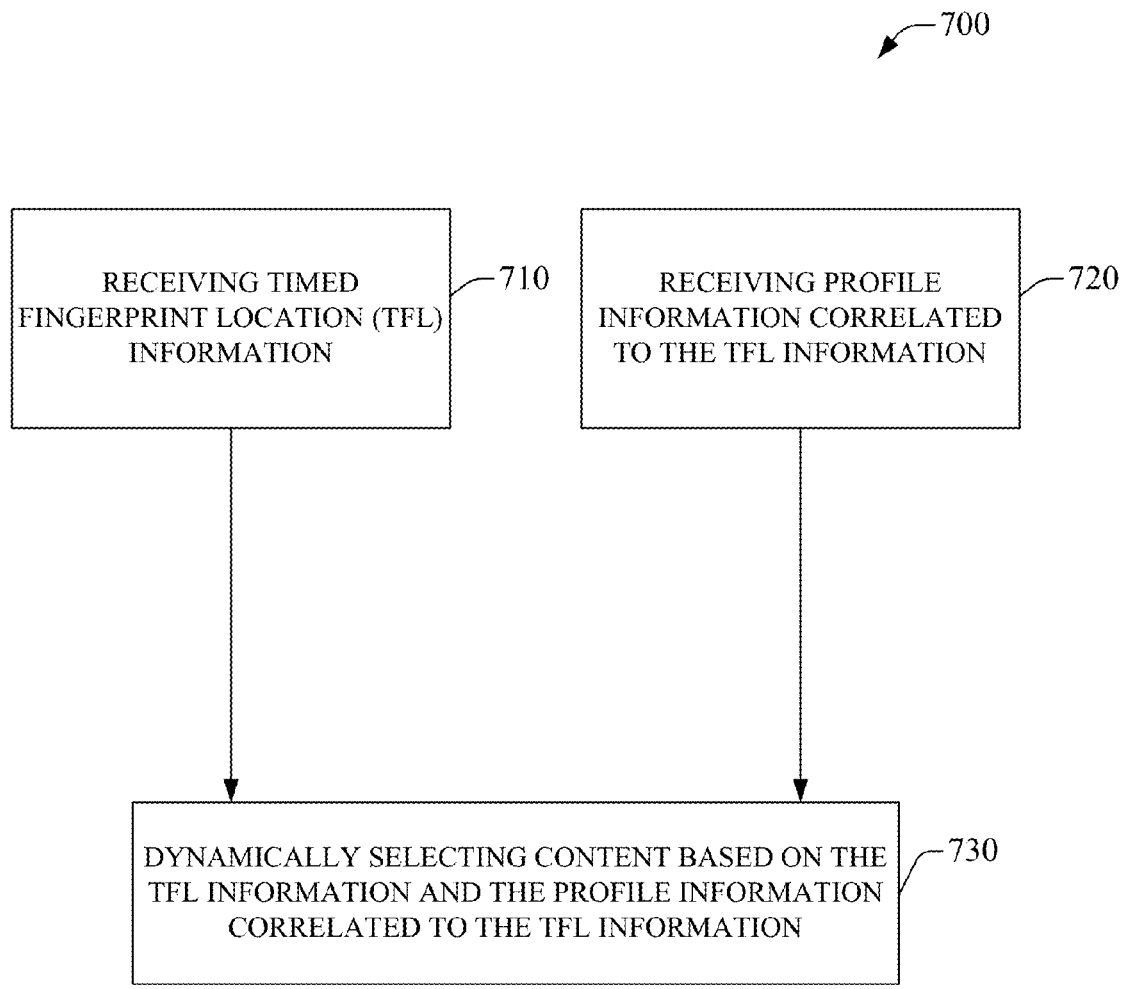
FIG. 7 illustrates a method for facilitating dynamic selection of content through timed fingerprint location information in accordance with aspects of the subject disclosure.
Figure 8:
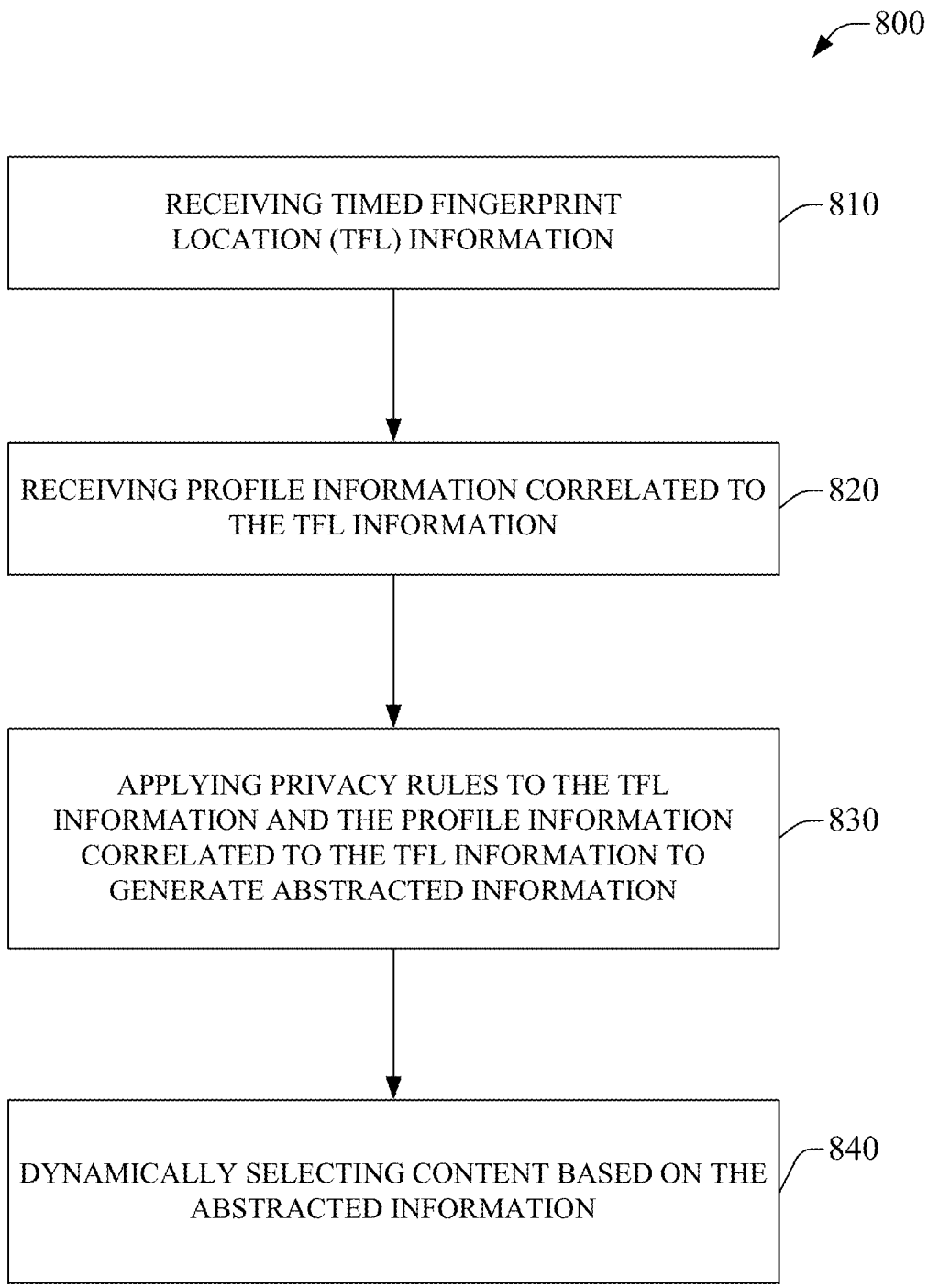
FIG. 8 illustrates a method for facilitating dynamic selection of content through timed fingerprint location information in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of a method 600 facilitating dynamic selection of content through timed fingerprint location information in accordance with aspects of the subject disclosure. At 610, method 600 can receive timed fingerprint location (TFL) information. TFL information can include location information as disclosed in more detail in U.S. Ser. No. 12/712,424 filed Feb. 25, 2010, which application is hereby incorporated by reference in its entirety. As such, TFL information can include location information for a UE based on timing information. As a non-limiting example, a mobile device, including mobile devices not equipped with a GPS-type system, can be located by looking up timing information associated with the mobile device from a TFL information reference. As such, the exemplary mobile device can be located using TFL information without employing GPS-type techniques. In an aspect, TFL information can include information to determine a DV(?,X). The centroid region (possible locations between any site pair) for an observed time value associated with any NodeB site pair (NBSP) can be calculated and is related to the determined value (in units of chip) from any pair of NodeBs. When UE time data is accessed, a DV(?,X) look-up can be initiated. Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frames locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is most likely in both sets, it is probable that the location for the UE is at the intersection of the two sets. Additional NBSPs can be included to further narrow the possible locations of the UE.

At 620, method 600 can dynamically select content based on the TFL information received at 610. At this point, method 600 can end. Content can be selected from a superset of content. Content can include just about any type of information in just about any form. Content can include audible information, visual information, tactile information, olfactory information, etc. For example, content can be an audio message, a visual advertisement, a sample texture, etc. Dynamic selection of a subset of content from a superset of content can be based, at least in part, on TFL information, including location information for a UE in a TFL wireless carrier environment. For example, a UE entering a designated set of bin grid frames can be employed as a criterion for selecting a subset of content. Numerous other examples are not recited for brevity but are considered within the scope of the present disclosure.

FIG. 7 illustrates a method 700 that facilitates dynamic selection of content through timed fingerprint location information in accordance with aspects of the subject disclosure. At 710, TFL information can be received. At 720, profile information correlated to the TFL information can be received. Profile information can include nearly any type of secondary information correlated with the TFL information. For example, profile information can include subscriber profile information maintained by a wireless network provider, a personal profile maintained by a user or customer, a social networking information, information sets maintained by third parties, internet histories, purchase histories, loyalty card information, etc.

At 730, method 700 can dynamically select content based on the TFL information and the profile information correlated to the TFL information. At this point, method 700 can end. As such, in addition to dynamically selecting content based on positional information, e.g., the location or anticipated location of a UE such as by TFL information, dynamic content selection can further incorporate consideration of profile information and other secondary information. As a non-limiting example, it can be determined from a user profile that the user has a preference for expensive shoes, as such, advertisements for expensive shoes can be included in dynamically selected content intended for consumption by the user, for example at a predetermined location based on the anticipated arrival of the user at that predetermined location at a time in the future, such as at a time and location as determined by analysis of TFL information.

FIG. 8 illustrates a method 800 that facilitates dynamic selection of content through timed fingerprint location information in accordance with aspects of the subject disclosure. At 810, TFL information can be received. At 820, profile information correlated to the TFL information can be received. At 830, method 800 can apply privacy rules to the TFL information and the profile information to generate abstracted information. Abstracted information can be information that limits the exposure of personal or private information. For example, abstracted information can be agglomerated data including enough data that it becomes less likely that personally identifying information can be extracted from the mass of data. As a second example, abstracted information can be redacted information that has had private or personal information parts removed from the abstracted information set. As another example, abstracted data can be limited to propagation only to approved parties (e.g., whitelisting) or specifically prohibited from propagation to specified parties (e.g., blacklisting). Numerous other abstraction techniques can be employed with sufficient efficacy and, even where not explicitly enumerated, is considered within the scope of the present disclosure. At 840 content can be dynamically selected based on the abstracted information. At this point, method 800 can end.

Figure 9:
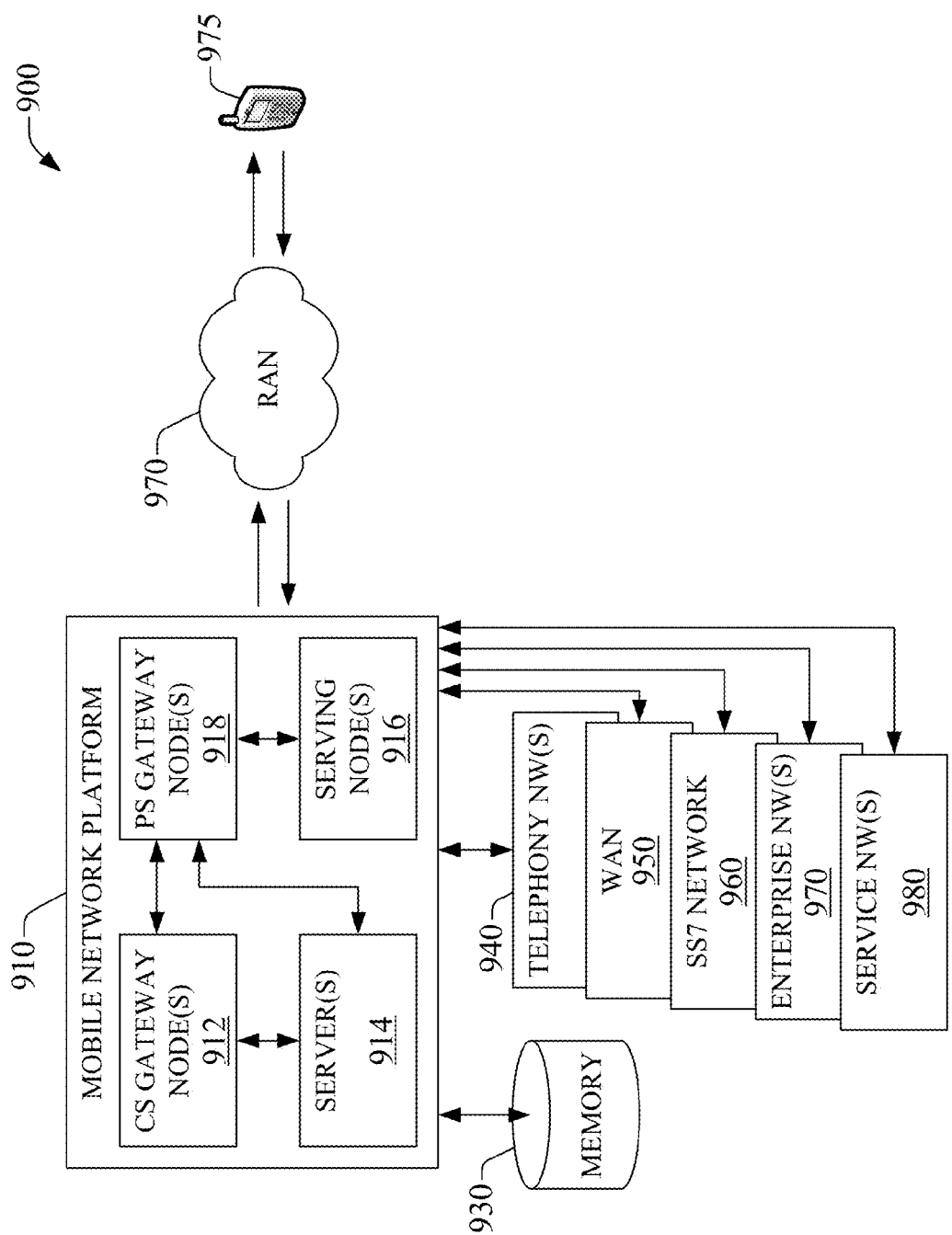
FIG. 9 is a block diagram of an exemplary embodiment of a mobile network platform to implement and exploit various features or aspects of the subject disclosure.

FIG. 9 presents an example embodiment 900 of a mobile network platform 910 that can implement and exploit one or more aspects of the subject innovation described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included as part of a telecommunications carrier network, including telecommunications carrier networks employing timed fingerprint location environments. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
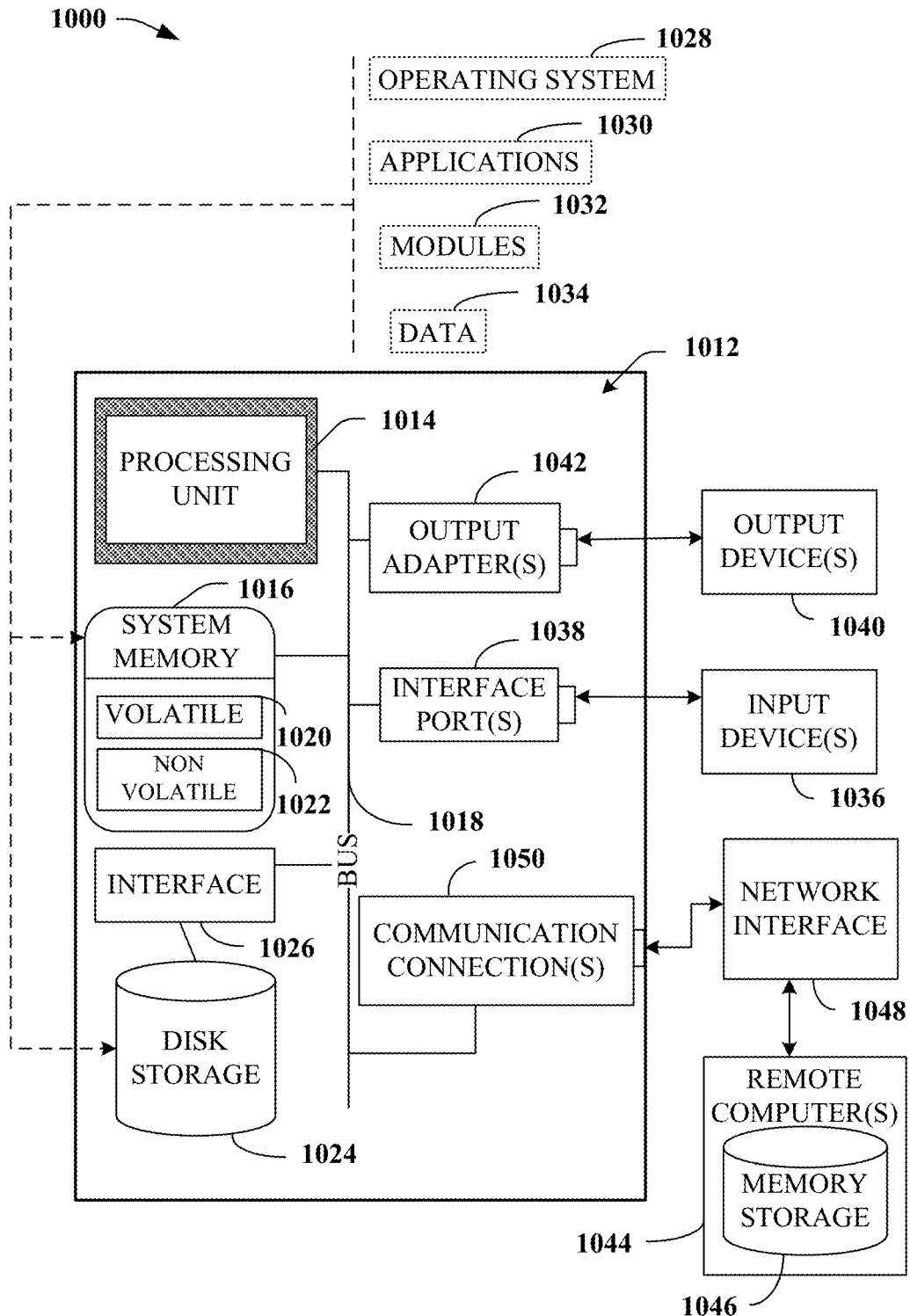
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory, for example, can be included in volatile memory 1020, non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012 (which can be, for example, part of the hardware of a timed fingerprint location environment), includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026. For example, disk storage 1024 can store one or more TFL lookup tables facilitating lookup of location information based on NodeB site pairs and time values.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028 (e.g., OS component(s) 312, etc.) Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1011 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the term "core-network", "core", "core carrier network", or similar terms can refer to components of a telecommunications network that typically providing some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femtocell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
 a memory to store instructions; and
 a processor, coupled to the memory, that facilitates execution of the instructions to perform operations, comprising:
  receiving timed fingerprint location information;
  determining a current location of a user equipment based on a device timing measurement associated with the user equipment and the timed fingerprint location information, wherein the timed fingerprint location information is based on a differential timing measurement related to a pair of NodeB devices comprising a first NodeB device and a second NodeB device, wherein the differential timing measurement is correlated to prior location information for a geographic location determined before the timed fingerprint location information is received by the system, and wherein the prior location information and the differential timing measurement are stored as part of the timed fingerprint location information to facilitate determining the current location of the user equipment, from the timed fingerprint location information, based on a request to determine the geographic location based on the device timing measurement and the differential timing measurement without redetermining the geographic location; and selecting a subset of content from a set of content based on the current location of the user equipment.

2. The system of claim 1, wherein a condition related to selection of the subset of content from the set of content is determined to be satisfied based on the current location of the user equipment.

3. The system of claim 1, wherein the timed fingerprint location information comprises a set of historic location information and a set of time information for the user equipment.

4. The system of claim 3, wherein the set of historic location and the set of time information for the user equipment is employed to generate a prediction of a future location of the user equipment.

5. The system of claim 1, wherein the timed fingerprint location information comprises another location of a second user equipment.

6. The system of claim 5, wherein a condition related to selection of the subset of content from the set of content is determined to be satisfied based on the current location of the user equipment and the other location of the second user equipment.

7. The system of claim 1, further comprising:
receiving a rule associated with a determination of satisfaction of a condition related to selection of the subset of content from the set of content based on the timed fingerprint location information.

8. The system of claim 1, further comprising:
limiting a propagation of information designated as private information.

9. The system of claim 1, further comprising:
receiving secondary information correlated to the timed fingerprint location information.

10. The system of claim 9, wherein the secondary information comprises a user preference.

11. The system of claim 9, wherein the secondary information comprises historical user information.

12. The system of claim 9, wherein the secondary information comprises user demographic information.

13. A method, comprising:
receiving, by a system comprising a processor, timed fingerprint location information associated with a user equipment in a timed fingerprint location environment, wherein the timed fingerprint location information facilitates determining a current location of the user equipment based on a device timing measurement associated with the user equipment and the timed fingerprint location information, wherein the timed fingerprint location information is based on a differential timing measurement related to a pair of NodeB devices comprising a first NodeB device and a second NodeB device, wherein the differential timing measurement is correlated to prior location information for a geographic location determined before the timed fingerprint location information is received by the system, and wherein the prior location information and the differential timing measurement are stored as part of the timed fingerprint location information to facilitate determining the current location of the user equipment based on querying the timed fingerprint location information to determine the geographic location based on the device timing measurement and the differential timing measurement without redetermining the geographic location; and selecting, by the system, a subset of content from a set of content based on the timed fingerprint location information.

14. The method of claim 13, wherein the receiving comprises receiving, by the system, historic location information of the user equipment.

15. The method of claim 14, further comprising:
predicting, by the system, a future location of the user equipment based on the historic location information.

16. The method of claim 13, further comprising:
receiving, by the system, secondary information correlated to the timed fingerprint location information, wherein the selecting the subset of content from the set of content is further based on the secondary information.

17. The method of claim 16, wherein the secondary information comprises a user preference.

18. A user equipment, comprising:
a memory to store instructions; and
a processor, coupled to the memory, that facilitates execution of the instructions to perform operations, comprising:
receiving a current location of the user equipment based on a device timing measurement associated with the user equipment and timed fingerprint location information, wherein the timed fingerprint location information is based on a differential timing measurement related to a pair of NodeB devices comprising a first NodeB device and a second NodeB device, wherein the differential timing measurement is correlated to prior location information for a geographic location determined before the timed fingerprint location information is employed in a determination of the current location of the user equipment, and wherein the prior location information and the differential timing measurement are stored as part of the timed fingerprint location information to facilitate determining the current location of the user equipment by accessing the timed fingerprint location information to determine the geographic location based on the device timing measurement and the differential timing measurement without redetermining the geographic location; and
selecting a subset of content from a set of content based on the current location of the user equipment.

19. The user equipment of claim 18, wherein the selecting is based on a future location of the user equipment predicated on the current location of the user equipment.

20. The user equipment of claim 18, further comprising:
receiving secondary user information comprising a user preference, historical user information, and user demographic information, wherein the selecting is further based on the secondary information.

* * * * *